United States Patent
Berk et al.

(10) Patent No.: US 11,748,475 B1
(45) Date of Patent: Sep. 5, 2023

(54) DETECTION AND RECOVERY FROM RANSOMWARE INFECTIONS

(71) Applicant: Riverbed Technology, Inc., San Francisco, CA (US)

(72) Inventors: Vincent H. Berk, Lyme, NH (US); Ian D. Gregorio-de Souza, Hanover, NH (US)

(73) Assignee: Riverbed Technology, LLC, San Francisco, CA (US)

( * ) Notice: Subject to any disclaimer, the term of this patent is extended or adjusted under 35 U.S.C. 154(b) by 0 days.

(21) Appl. No.: 17/168,694

(22) Filed: Feb. 5, 2021

Related U.S. Application Data

(60) Provisional application No. 62/970,501, filed on Feb. 5, 2020.

(51) Int. Cl.
  *G06F 21/55* (2013.01)
  *G06F 21/56* (2013.01)
  *G06F 21/78* (2013.01)

(52) U.S. Cl.
  CPC .......... *G06F 21/554* (2013.01); *G06F 21/564* (2013.01); *G06F 21/565* (2013.01); *G06F 21/568* (2013.01); *G06F 21/78* (2013.01)

(58) Field of Classification Search
  USPC .......................................................... 726/22
  See application file for complete search history.

(56) References Cited

U.S. PATENT DOCUMENTS

| | | | |
|---|---|---|---|
| 10,503,904 B1* | 12/2019 | Singh | G06F 21/566 |
| 10,671,302 B1* | 6/2020 | Aggarwal | G06F 3/067 |
| 11,216,186 B1* | 1/2022 | Armangau | G06F 3/0689 |
| 11,275,509 B1* | 3/2022 | Colgrove | G06F 11/1076 |
| 2017/0206034 A1* | 7/2017 | Fetik | G06F 3/0604 |
| 2019/0028501 A1* | 1/2019 | Choudhary | H04L 41/142 |
| 2019/0108340 A1* | 4/2019 | Bedhapudi | G06F 21/554 |
| 2019/0108341 A1* | 4/2019 | Bedhapudi | G06F 16/1752 |
| 2019/0116047 A1* | 4/2019 | Struttmann | G06F 16/9024 |
| 2019/0228148 A1* | 7/2019 | Pohl | G06F 3/0659 |
| 2019/0288850 A1* | 9/2019 | Beecham | G06F 21/602 |
| 2019/0392063 A1* | 12/2019 | Tosukhowong | G06F 16/2379 |
| 2020/0104266 A1* | 4/2020 | Chhabra | G06F 12/1408 |
| 2020/0274894 A1* | 8/2020 | Argoeti | H04L 63/1433 |
| 2021/0012002 A1* | 1/2021 | Rosenthal | G06F 11/1451 |
| 2021/0117132 A1* | 4/2021 | Vankamamidi | G06F 3/0688 |

* cited by examiner

*Primary Examiner* — Sakinah White Taylor
(74) *Attorney, Agent, or Firm* — Park, Vaughan, Fleming & Dowler LLP; Laxman Sahasrabuddhe

(57) ABSTRACT

Systems and techniques are described to detect and recover from ransomware infections. It may be determined if a ransomware attack is in progress based on analyzing read and write requests to a file system. Next, a mitigation action may be performed in response to determining that a ransomware attack is in progress.

15 Claims, 2 Drawing Sheets

---

Determine if a ransomware attack is in progress based on analyzing read and write requests to a file system — 102

Perform a mitigation action in response to determining that a ransomware attack is in progress — 104

DETECTION AND RECOVERY FROM RANSOMWARE INFECTIONS

RELATED APPLICATION

This application claims benefit of U.S. Provisional Patent Application No. 62/970,501, filed on 5 Feb. 2020, the contents of which are herein incorporated by reference in their entirety for all purposes.

TECHNICAL FIELD

This disclosure generally relates to computer security. More specifically, this disclosure relates to detection and recovery from ransomware infections.

BACKGROUND

The term "ransomware" may refer to malware that blocks or prevents access to data. For example, ransomware may encrypt all the files in a file system with a secret cryptographic key known to the attacker. Only after a "ransom" is paid to the attacker, is access granted to the encrypted data. For example, the attacker may release the secret cryptographic key (which may then be used to decrypt the encrypted files) after money is transferred to the attacker. Ransomware can cause substantial damage to the victim, and it may take several weeks or months for the victim to recover from an attack.

SUMMARY

Embodiments described herein provide systems and techniques to detect and recover from ransomware infections. Some embodiments may determine if a ransomware attack is in progress based on analyzing read and write requests to a file system. Specifically, in some embodiments, read and write requests to a shared file system are analyzed. Next, the embodiments may perform a mitigation action in response to determining that a ransomware attack is in progress.

In some embodiments, analyzing read and write requests to the file system includes calculating a ratio of a count of read requests to a count of write requests received from a client. The likelihood that a ransomware attack is in progress may increase if the ratio is below a threshold value.

In some embodiments, analyzing read and write requests to the file system includes calculating an entropy of a file block associated with a write request. Specifically, when a file block is modified, the entropy before the modification and after the modification may be compared. The likelihood that a ransomware attack is in progress may increase if the entropy of the file block increases by more than a threshold amount after the modification.

In some embodiments, analyzing read and write requests to the file system includes calculating a compression ratio for compressing a file block associated with a write request. Specifically, when a file block is modified, the compression ratio before the modification and after the modification may be compared. The likelihood that a ransomware attack is in progress may increase if the compression ratio of the file block decreases by more than a threshold amount after the modification.

In some embodiments, analyzing read and write requests to the file system includes ranking clients in decreasing order based on a count of write requests received from the clients over a time interval. The likelihood that a ransomware attack is in progress may increase if it is detected that the rank of a client increased by an amount that is greater than a threshold.

In some embodiments, analyzing read and write requests to the file system includes detecting a write request for a canary file. Specifically, a canary file may be a file that is not used by any application. Thus, the likelihood that a ransomware attack is in progress may increase if a client attempts to write to the canary file.

In some embodiments, performing the mitigation action includes generating an alert.

In some embodiments, performing the mitigation action includes storing an unmodified version of a file block associated with a write request.

In some embodiments, performing the mitigation action includes reducing a rate at which read and write requests are processed for a client associated with the ransomware attack.

In some embodiments, performing the mitigation action includes disconnecting a client associated with the ransomware attack.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following embodiments: (1) only X; (2) only Y; (3) only Z; (4) X and Y; (5) X and Z; (6) Y and Z; and (7) X, Y, and Z.

Anti-virus based approaches for detecting ransomware rely on a signature database of known ransomware to stop the attacks when the ransomware begins to infect the endpoint. However, if a ransomware is unknown, it cannot be detected by such techniques. It is easy for attackers to change the signature of ransomware so that it is undetectable by anti-virus based approaches. Additionally, even if one host in a network does not have an anti-virus based detector installed on it, a ransomware infection can still wreak havoc on the file-shares of the company.

Some approaches use backups to allow a system to recover in case of a ransomware attack. However, backups may be out of date, systems may not have been configured to be backed up online, and in some cases, the backups may also be compromised (e.g., encrypted) by ransomware.

Additionally, it is possible for the backups to be overwritten by the encrypted files, corrupting the backup.

For these reasons, there is a need for techniques and systems for detecting and recovering from ransomware infections. Some embodiments described herein may be used in conjunction with other approaches to detect ransomware infections (including ransomware infections whose signature is not known), stop it, and recover quickly.

Figure 1:
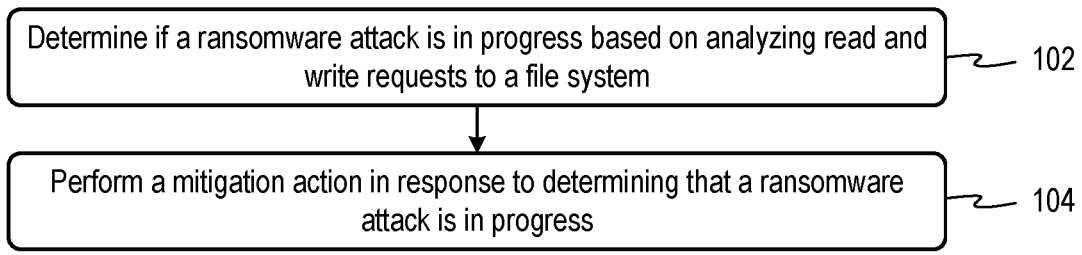
FIG. 1 illustrates a process for detecting and recovering from ransomware infections in accordance with some embodiments described herein.

FIG. 1 illustrates a process for detecting and recovering from ransomware infections in accordance with some embodiments described herein.

The process may begin by determining if a ransomware attack is in progress based on analyzing read and write requests to a file system (at 102). Specifically, in some embodiments, the read and write requests to a shared file system may be analyzed. The term "file system" relates to a system that controls how files are stored and enables clients to perform operations on the files. Examples of file systems include, but are not limited to, Network File System (NFS) and Common Internet File System (CIFS). The term "shared file system" may refer to a file system that is shared by multiple clients. The term "read request" may refer to a request to the file system to read a file block, and the term "write request" may refer to a request to the file system to write a file block. A file block that is desired to be written accompanies a write request.

In some embodiments, the process may compute a score for a client that corresponds to the likelihood that the client is infected by ransomware. Specifically, one or more aspects of the file access behavior of the client may be analyzed to determine one or more score increments. The score increments may include, but are not limited to (1) a first score increment based on a ratio of a count of read requests and a count of write requests, (2) a second score increment based on a binary entropy measure of a disk block, (3) a third score increment based on a change in a writing behavior of a client, (4) a fourth score increment based on whether a client attempts to write to all blocks of a file, and (5) a fifth score increment based on whether a client accesses a "canary" file.

Typical file system interactions include a substantially higher proportion of read requests than write requests. Thus, a ratio of the number of read requests to the number of write requests over a given time interval may be computed. In some embodiments, the score increment may be equal to the read/write ratio. In some embodiments, the score increment may be based on comparing the read/write ratio with one or more thresholds. In some embodiments, the score may be incremented for a client by a certain amount as this read/write ratio approaches 1.

Usually, structured files are compressible, while encrypted files are not. In some embodiments, a binary entropy value may be computed for each file block. For example, a Shannon entropy score may be computed for each file block. In another embodiment, a compression ratio may be determined by attempting to compress the file block using a compression technique. If the entropy of a file increases significantly or the file block becomes significantly less compressible after modification, then the score may be incremented for the client by a certain amount.

The clients may be ranked based on the number of write requests that the clients send to the file server within a given time window. Typically, the ranking is stable, i.e., the clients that have a high rank continue to have a high rank, and the clients that have a low rank continue to have a low rank. Thus, if a client unexpectedly moves up the ranking into the top-N writers (where the value N is configurable), then a score for the client may be incremented by a certain amount.

Typically, a client modifies only certain blocks of a file. Thus, if a client modifies all the blocks of a file, then a score for the client can be incremented by a certain amount.

In some embodiments, a special "canary" file can be placed in the file system that is not associated with any application and so the file is not expected to be accessed by any client. Thus, if a canary file is accessed or written to, a score for the client can be incremented by a certain amount.

The current score associated with a given client may be compared with one or more thresholds to determine the risk or likelihood that the given client is infected with ransomware. Some normal behaviors, such as compressing all the files in the file system, may have a file access pattern that is similar to the file access pattern that is expected during a ransomware attack. Thus, care must be taken to not create a low threshold for triggering a mitigation action.

In some embodiments, the score may be decayed (i.e., decremented or reduced) exponentially. In some embodiments, an array of scores may be maintained, where array element $s_i$ corresponds to client i. The array elements may be initialized to zero upon a reset operation. Next, a score increment may be computed for each client, and the corresponding array element may be incremented by the score increment. To implement exponential decay, the current value of the array element may be multiplied by a decay factor, and then the score increment may be added. Specifically, in some embodiments, the score may be updated at discrete time steps using the expression $s_i(t_n)=\alpha \cdot s_i(t_{n-1})+r_i$, where $s_i(t_n)$ is the score for client i in time step $t_n$, $s_i(t_{n-1})$ is the score for client i in the previous time step $t_{n-1}$, $\alpha$ is the decay factor ($0<\alpha<1$), and $r_i$ is the current score increment based on analyzing the behavior of client i. The current score increment $r_i$ may be a weighted sum of different score increments that are computed based on analyzing different aspects of client behavior as described above.

In some embodiments, the score may be decayed (i.e., decremented or reduced) by a constant amount in each time step. Specifically, the current value of the array element may be decremented by a constant value, and then the score increment may be added. Specifically, in some embodiments, the score may be updated at discrete time steps using the expression $s_i(t_n)=s_i(t_{n-1})-c+r_i$, where $s_i(t_n)$ is the score for client i in time step $t_n$, $s_i(t_{n-1})$ is the score for client i in the previous time step $t_{n-1}$, c is a constant value by which the score is decremented in each step (in some embodiments, the score is not allowed to be negative; thus, once the score becomes zero, it is no longer decremented any further), and $r_i$ is the current score increment based on analyzing the behavior of client i. The current score increment $r_i$ may be a weighted sum of different score increments that are computed based on analyzing different aspects of client behavior as described above.

Referring to FIG. 1, the process may perform a mitigation action in response to determining that a ransomware attack is in progress (at 104). Mitigation actions include, but are not limited to, (1) generating an alert, (2) storing an unmodified version of a file block, (3) reducing communication and/or processing resources that are available to the infected client, and (4) quarantining or disconnecting the infected client.

Some embodiments may generate alerts using techniques that include, but are not limited to, a system log, email, and a messaging application. In general, the alert may be generated in a manner that attracts the attention of a user or an administrator so that the user or administrator may decide if a mitigation action is appropriate.

Some embodiments may tag each modified disk block and maintain a copy of the original (i.e., unmodified) block if a ransomware infection is suspected, or until a preset timer expires. Storing unmodified versions of file blocks can enable the system to restore the modified file blocks to their original (i.e., unmodified) form if a ransomware infection is confirmed.

Some embodiments may reduce communication and/or processing resources that are available to the infected client (also known as "tarpitting"), e.g., by throttling the bandwidth of the infected client. Reducing communication and/or processing resources can slow down the infected client, limit the damage, and provide more time for the system or a user to determine if a ransomware attack is in progress.

Some embodiments may disconnect the infected client from the file system or the network to stop the attack and to prevent further spreading of the ransomware infection.

Some embodiments may require the file system to only accept inbound modifications through a device which is monitoring read and write requests and determining if a ransomware attack is in progress.

In some embodiments, a progressive mitigation approach may be used in which different mitigation actions are performed depending on the likelihood that a ransomware attack is in progress. For example, multiple score thresholds may be defined, where each threshold may be associated with a mitigation action. As the likelihood score changes over time, the system may appropriately modify the mitigation action(s) that are being performed. For example, the system may have a low, medium, and high threshold. If the likelihood score is less than the low threshold, no mitigation action is taken. If the likelihood score is between the low and medium threshold, the system may generate an alert and begin storing unmodified versions of file blocks in case a ransomware infection is confirmed. If the likelihood score is between the medium and high threshold, then the system may additionally (i.e., in addition to generating alerts and storing unmodified versions of file blocks) begin reducing communication and/or processing resources that are available to the infected client. Finally, if the likelihood score is greater than the high threshold, then the system may quarantine or disconnect the infected client.

Figure 2:
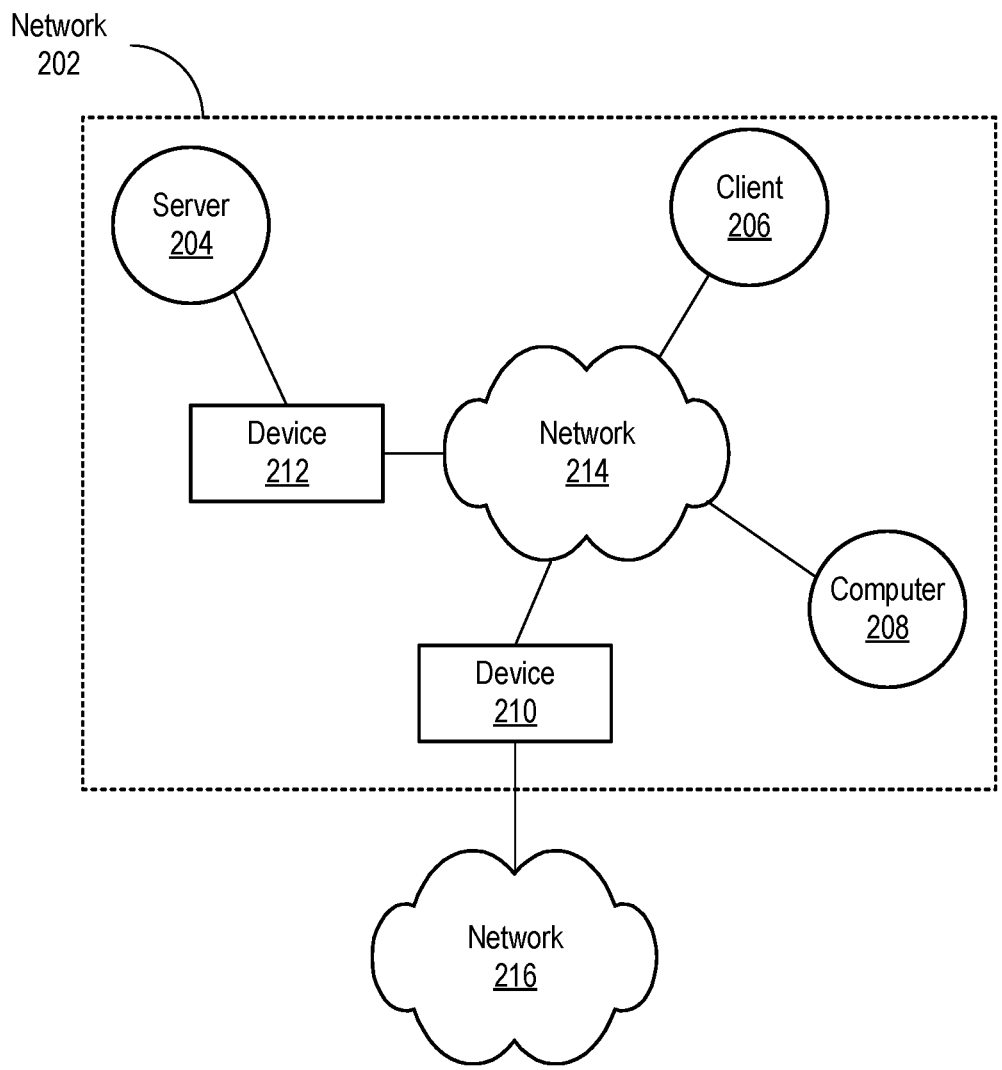
FIG. 2 illustrates a network in accordance with some embodiments described herein.

FIG. 2 illustrates a network in accordance with some embodiments described herein.

Network 202 may include server 204, client 206, computer 208, and devices 210 and 212, which may communicate with one another over network 214. Network 202 may be communicatively coupled with other networks, e.g., network 202 may be communicatively coupled with network 216 through device 210.

Some embodiments may implement techniques and systems for detecting and recovering from ransomware infections by using one or more computers, devices, and/or servers. For example, in some embodiments, techniques and systems disclosed herein may be implemented in device 212, which may be a wide area network (WAN) optimization device. In some embodiments, techniques and systems disclosed herein may be implemented in server 204, which may be a file server.

The term "device" may generally refer to any apparatus that can perform computations and communicate with other devices. In some embodiments, a device can include a processing mechanism that can execute instructions stored on a storage medium. Examples of devices include, but are not limited to, file servers, appliances, routers, switches, smartphones, handheld computers, laptop computers, desktop computers, distributed computers, and printers.

The term "network" may refer to multiple interconnected devices. A network can deliver information from one device (e.g., a server) to another device (e.g., a client computer). Examples of networks include, but are not limited to, wireless and wired networks, local area networks (LANs), metropolitan area networks (MANs), WANs, private networks, public networks, intranets, and internets.

Communication between two devices or nodes of a network is typically accomplished using a layered software architecture, which is often referred to as a networking software stack or a networking stack. A given functionality in a networking stack can be implemented using hardware or software or a combination thereof. The decision to implement a specific functionality in hardware or software is typically based on a tradeoff between performance and cost.

Each layer in a networking stack may be associated with one or more protocols which define the rules and conventions for processing packets in that layer. Each lower layer may perform a service for the layer immediately above it to help with processing packets, and each layer may add a header (control data) that allows peer layers to communicate with one another. At the sender, each layer may add layer specific headers to the packet as the packet moves from higher layers to lower layers. The receiver may process headers of each layer as the payload moves from the lowest layer to the highest layer.

A data link layer or link layer may refer to a layer that manages a communication channel between adjacent devices in the network. For example, if two routers are connected to each other via a cable, then the link layer may manage the communication channel between these two routers. Ethernet is an example of a link layer. A network layer may refer to a layer that enables communication between any two devices across the network. Internet Protocol (IP) layer is an example of a network layer that enables communication between two routers in an IP network.

Enterprise networks can include one or more WANs that interconnect offices that can be distributed over a large geographical area. Some enterprise networks may use WAN optimization devices to improve network performance. WAN optimization devices may compress data (e.g., by performing de-duplication) and perform other optimization tasks (e.g., caching, prefetching, etc.) to improve WAN performance. WAN optimization devices may operate singly or in pairs at each side of a WAN connection to optimize network traffic. WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers.

Techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. In this disclosure, the term "WAN optimization device" is used to refer to such devices.

In some embodiments, ML may be used to determine if a ransomware attack is in progress. In this disclosure, ML may generally refer to computational techniques and systems that learn how to make accurate predictions based on training data. ML may be implemented using an ML model. Once the ML model has been trained, it may be validated, and then used to predict output values based on input values.

Figure 3:
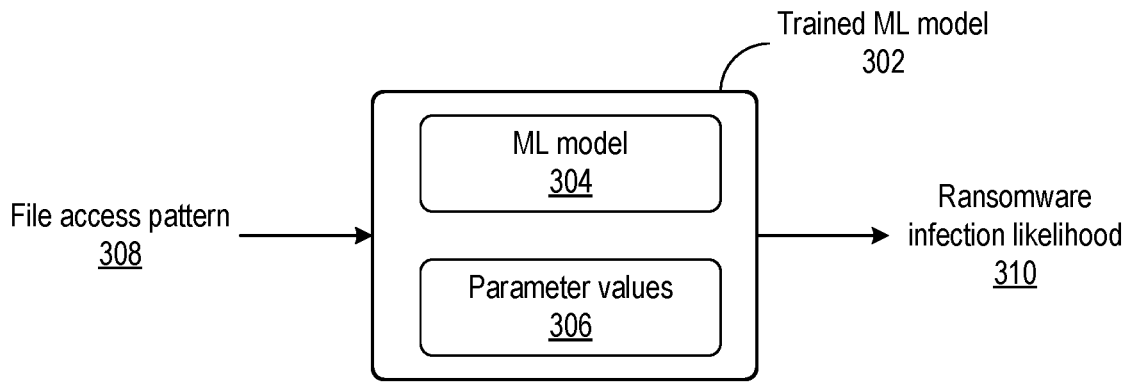
FIG. 3 illustrates a machine learning (ML) model in accordance with some embodiments described herein.

FIG. 3 illustrates an ML model in accordance with some embodiments described herein. Trained ML model 302 generates ransomware infection likelihood 310 based on file access pattern 308. Specifically, trained ML model 302 may include ML model 304 and parameter values 306. ML model 304 may use parameter values 306 to perform computations on the file access pattern 308, and the results of these computations may be provided as the ransomware infection likelihood 310.

Specifically, a testbed may be created to generate file access pattern data for normal operation and for ransomware attacks. Next, a supervised ML process may be used to train ML model 304 using the file access pattern data. During training, the supervised ML process may modify ML model 304 and/or parameter values 306. An error function or loss function may be defined based on a difference between the ransomware infection prediction (as computed by the current state of ML model 304 and parameter values 306) and the training data (which specifies whether a ransomware attack was in progress). The supervised ML process may modify ML model 304 and/or parameter values 306 to reduce the error function value or loss function value. Trained ML model 302 is obtained once the supervised ML process completes training.

Figure 4:
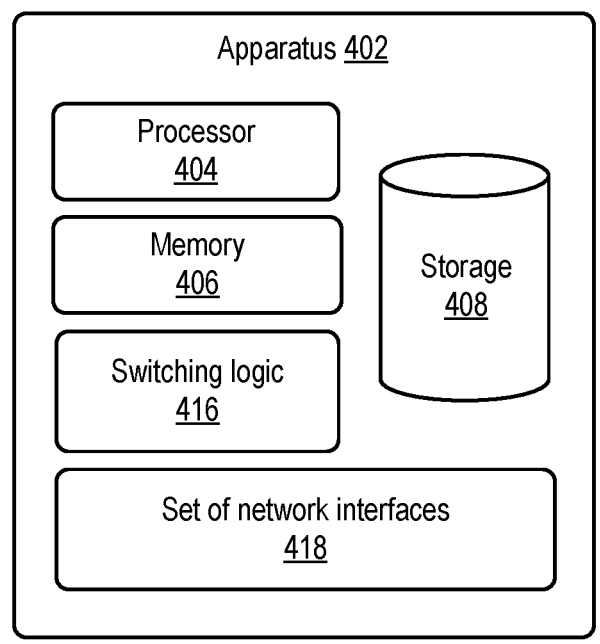
FIG. 4 illustrates an apparatus in accordance with some embodiments described herein.

FIG. 4 illustrates an apparatus in accordance with some embodiments described herein. Apparatus 402 (e.g., a device, a file server, etc.) can include processor 404, memory 406 (e.g., a volatile or non-volatile random access memory), and storage 408 (e.g., a flash memory device or a disk drive). Storage 408 can store data and executable code. The components in apparatus 402 can communicate with one another using a communication mechanism (not shown in FIG. 4), e.g., a bus, a backplane, and/or a switching fabric. Executable code stored in storage 408 can include instructions that, when executed by processor 404, cause apparatus 402 to perform one or more methods that are implicitly or explicitly described in this disclosure. Storage 408 can also store any data that is required by any processes that are performed by apparatus 402.

Apparatus 402 can also include switching logic 416 and set of network interfaces 418. Set of network interfaces 418 can be used to transmit data to and/or receive data from other communication devices. Switching logic 416 can forward network traffic received on one or more network interfaces in accordance with switching/forwarding/routing information stored in apparatus 402. Specifically, switching logic 416 can be configured by processor 404 in accordance with one or more methods that are implicitly or explicitly described in this disclosure.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   determining, by a processor, whether a ransomware attack is in progress based on analyzing read and write requests to a file system, wherein said analyzing comprises (1) calculating a ratio of a count of read requests to a count of write requests received from a client, (2) ranking clients in decreasing order based on counts of write requests received from the clients over a time interval, and (3) detecting an increase in a rank of the client which is greater than a threshold; and
   performing a mitigation action in response to determining that a ransomware attack is in progress.

2. The method of claim 1, wherein said analyzing read and write requests to the file system comprises calculating an entropy of a file block associated with a write request.

3. The method of claim 1, wherein said analyzing read and write requests to the file system comprises calculating a compression ratio for compressing a file block associated with a write request.

4. The method of claim 1, wherein said analyzing read and write requests to the file system comprises detecting a write request for a canary file.

5. The method of claim 1, wherein said performing the mitigation action comprises generating an alert.

6. The method of claim 1, wherein said performing the mitigation action comprises storing an unmodified version of a file block associated with a write request.

7. The method of claim 1, wherein said performing the mitigation action comprises reducing a rate at which read and write requests are processed for a client associated with the ransomware attack.

8. The method of claim 1, wherein said performing the mitigation action comprises disconnecting a client associated with the ransomware attack.

9. A non-transitory computer-readable storage medium storing instructions that, when executed by a processor, cause the processor to:
   determine whether a ransomware attack is in progress based on analyzing read and write requests to a file system, wherein said analyzing comprises (1) detecting a write request for a canary file, wherein the canary file is not expected to be accessed by a client, (2) calculating a ratio of a count of read requests to a count of write requests received from the client, (3) ranking clients in decreasing order based on counts of write requests received from the clients over a time interval, and (4) detecting an increase in a rank of the client which is greater than a threshold; and
   perform a mitigation action in response to determining that a ransomware attack is in progress.

10. The non-transitory computer-readable storage medium of claim 9, wherein said analyzing read and write requests to the file system comprises calculating an entropy of a file block associated with a write request.

11. The non-transitory computer-readable storage medium of claim 9, wherein said analyzing read and write requests to the file system comprises calculating a compression ratio for compressing a file block associated with a write request.

12. The non-transitory computer-readable storage medium of claim 9, wherein said performing the mitigation action comprises generating an alert.

13. The non-transitory computer-readable storage medium of claim 9, wherein said performing the mitigation action comprises storing an unmodified version of a file block associated with a write request.

14. The non-transitory computer-readable storage medium of claim 9, wherein said performing the mitigation action comprises reducing a rate at which read and write requests are processed for a client associated with the ransomware attack, or disconnecting the client associated with the ransomware attack.

15. An apparatus, comprising:
a memory storing instructions; and
a processor, coupled to the memory and to execute the instructions, the instructions when executed cause the processor to:
determine whether a ransomware attack is in progress based on analyzing read and write requests to a file system, wherein said analyzing comprises (1) calculating a ratio of a count of read requests to a count of write requests received from a client, (2) ranking clients in decreasing order based on counts of write requests received from the clients over a time interval, and (3) detecting an increase in a rank of the client which is greater than a threshold; and
perform a mitigation action in response to determining that a ransomware attack is in progress.

* * * * *